United States Patent [19]

Gunning

[11] 4,105,080
[45] Aug. 8, 1978

[54] AIR HAMMER WITH BLOW-OUT AIR SYSTEM

[75] Inventor: Samuel D. Gunning, Cleveland Heights, Ohio

[73] Assignee: Kent Air Tool Company, Kent, Ohio

[21] Appl. No.: 745,801

[22] Filed: Nov. 29, 1976

[51] Int. Cl.² ............................................. B25D 17/14
[52] U.S. Cl. ..................................... 173/66; 173/69
[58] Field of Search ..................................... 173/66–70

[56] References Cited

U.S. PATENT DOCUMENTS

| 1,605,714 | 11/1926 | Gilman | 173/66 X |
| 1,637,203 | 7/1927 | Slater | 173/69 |
| 1,826,095 | 10/1931 | Sheets et al. | 173/69 |
| 2,034,699 | 3/1936 | Hulshizer | 173/69 |
| 2,177,391 | 10/1939 | Lear | 173/69 |
| 2,251,224 | 7/1941 | Curtis | 173/69 |
| 2,643,640 | 6/1953 | Lear | 173/69 X |

FOREIGN PATENT DOCUMENTS 382,585  10/1932  United Kingdom ..................... 173/69

Primary Examiner—Lawrence J. Staab
Attorney, Agent, or Firm—John Harrow Leonard

[57] ABSTRACT

The air hammer is adapted to be connected to a source of pressurized air and has an exhaust passage means controlled by a settable exhaust valve. Reciprocation of the hammer is controlled by an automatic valve when the hammer is active. The exhaust passage means and exhaust valve are arranged so that in a first set position of the exhaust valve, it renders the hammer operative by the pressurized live air under the control of the automatic valve, and in a second set position of the exhaust valve, it renders the hammer inoperative by the pressurized live air. Further, in said second position of the exhaust valve, it admits live air from said source to the tool continuously in sufficient volume to blow out of a hole, in which the tool is operating, particulate matter theretofore produced in the hole by the tool. In the first position, the exhaust valve stops the flow of live blowout air to the tool. A smaller volume of live blow air, sufficient only to agitate the particulate matter in the hole, but not to blow it out of the hole, may be provided continuously to the tool. The exhaust valve has a handle arranged so that when the handle extends transversely of the hammer axis, the exhaust valve is in said first position, wherefore the hammer is active and the blowout air is cut off, and when the handle is parallel to the hammer axis, the exhaust valve is in said second position, wherefore the hammer is inactive and the blow-out air is admitted to the tool.

3 Claims, 7 Drawing Figures

FIG. 3
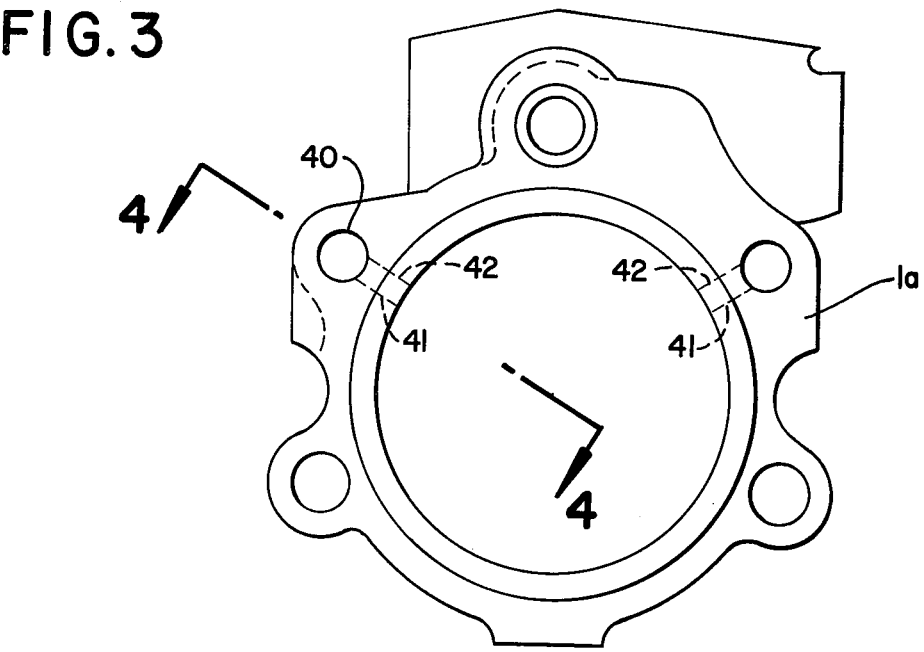
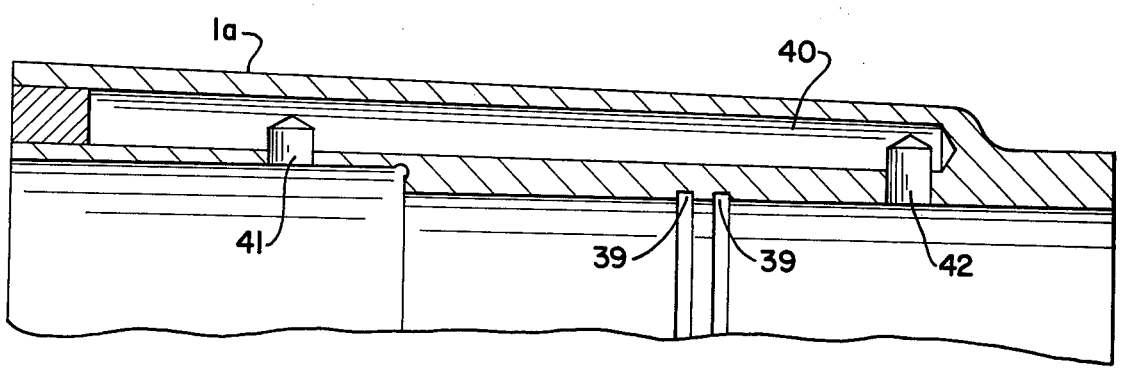
FIG. 4
FIG. 5
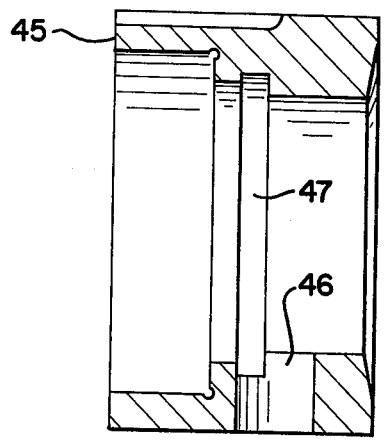

AIR HAMMER WITH BLOW-OUT AIR SYSTEM

BACKGROUND OF INVENTION

1. Field of Invention

Air hammer with pressurized blow-out air supply to tool tip.

2. Description of Prior Art

In prior air hammers of the conventional and drill type, pressurized live air is supplied to the power cylinder through a manually controlled inlet valve and exhausted through on exhaust port. An automatic valve controls reciprocation of the hammer by the live air admitted through the inlet valve. The hammer is rendered active and inactive by opening and closing the inlet valve.

In some of these hammers, if live blow-air is desired for agitating particulate matter in the hole being formed by the tool, the blow-air is supplied continuously through the automatic valve and to and through certain passageways of the hammer to the tool point. However, because of the nature and structure of the automatic valve and hammer parts, it is difficult to provide blow-air in sufficient quantity to blow the particulate out of the hole.

SUMMARY

The present hammer has a settable exhaust valve which controls its exhaust port and additional passages so arranged that, while the hammer remains connected to a source of pressurized air, the hammer can be rendered operative and inoperative by the pressurized air, selectively, by setting the exhaust valve in selected positions.

In a first, or open, position, the exhaust valve connects a port of the cylinder of the hammer to the atmosphere, whereupon the hammer is rendered active by the live air, with its reciprocation controlled by its automatic valve. In a second, or closed position, the exhaust valve disconnects that port from the atmosphere and air-locks the hammer, rendering it inactive though it remains connected to the source of pressurized air. Furthermore, when the exhaust valve is set in the second or closed position, it admits to the tool a continuous flow of live air from the source in a sufficient volume and velocity to blow-out of the hole being formed by the tool the particulate matter produced theretofore in the hole while the hammer was active. This blow-out air can be supplied independently of, or in augmentation of, any blow-air that might be supplied to the tool during hammer operation and which is sufficient only to agitate the particular matter in the hole without blowing it out of the hole.

The exhaust valve has a handle so arranged that when it is in a position transversely of the hammer axis, it sets the exhaust valve for rendering the hammer operative by the live air, and when it is in a position parallel to the hammer axis, it sets the exhaust valve for rendering the hammer inoperative by the live air and currently admits live blow-out air from the source to the tool.

Various objects and additional advantages of the invention will become apparent from the following description wherein reference is made to the drawings.

BRIEF DESCRIPTION OF THE DRAWINGS

FIG. 3 is a left end elevation of the barrel of the hammer, with the back-head of the barrel, which normally closes the back end, removed to show the relation of certain ducts in the barrel;

FIG. 4 is a fragmentary longitudinal sectional view of part of the barrel showing certain ducts and valving ports, and is taken on the line 4—4 of FIG. 3;

FIG. 5 is a longitudinal axial sectional view of a valve block of the automatic valve of the hammer;

Referring to FIGS. 1 and 2, the hammer comprises a barrel, indicated generally at 1, comprising a central barrel portion 1a and a front barrel portion 1b secured together in coaxial relation by suitable bolts 2. The rear end of the barrel portion 1a is closed by a suitable back-head 3. The front portion 1b carries a tool retaining member 4 through which extends a tool 5, shown as a drill, having a shank 5b and a through passage 6 which extends from the inner end of the shank 5b through the outer end of the tool 5 for discharging air under pressure at or adjacent the point or tip of the tool 5.

Figure 1:
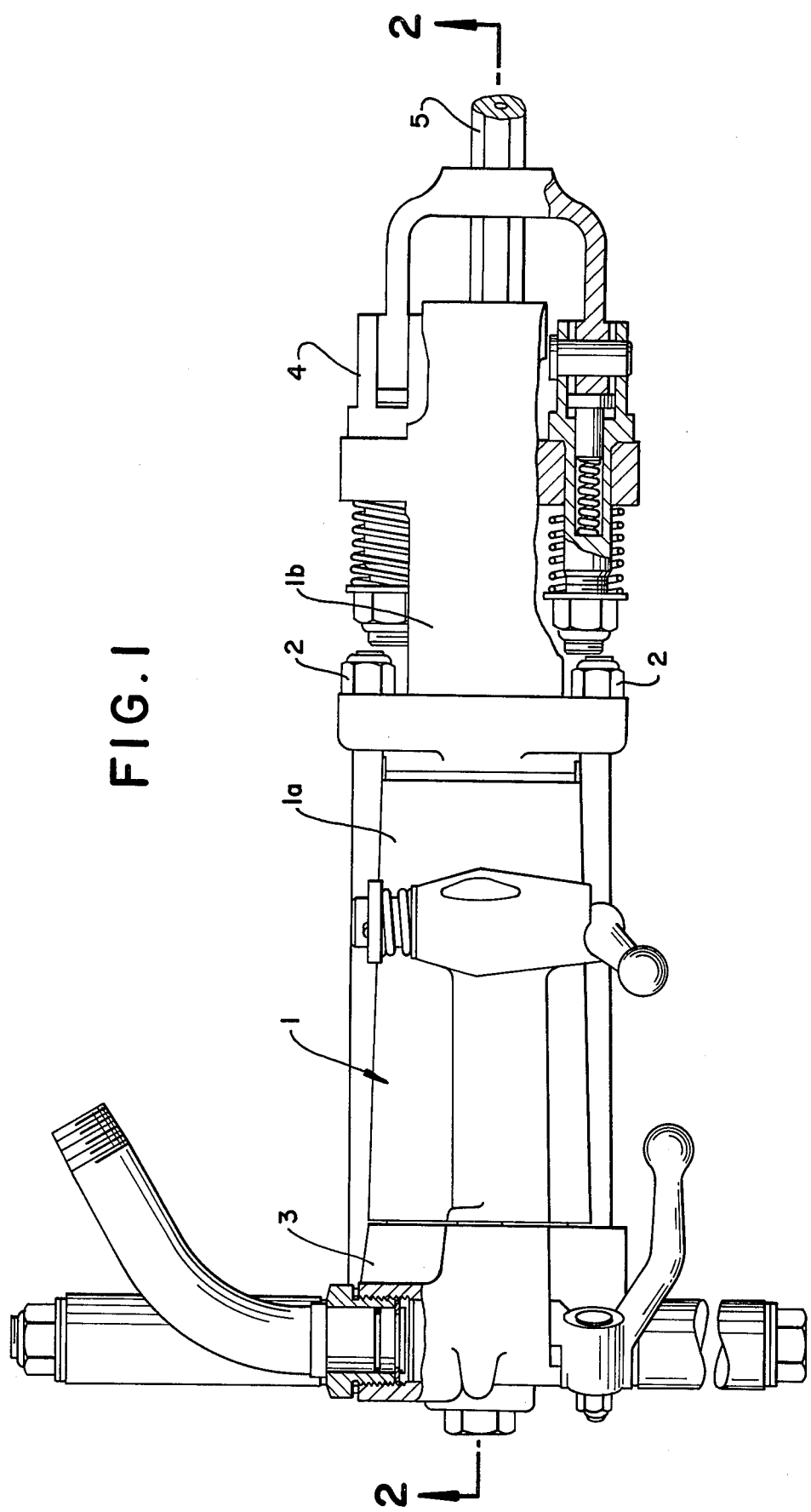
FIG. 1 is a top plan view of a hammer embodying the principles of the present invention.

The barrel has a power cylinder bore 7, and a coaxial intermediate auxiliary bore 8 of smaller diameter than the bore 7 and connected at its inner end thereto. The outer end of the bore 8 is connected to a coaxial tool guide passage, later described, in which the inner end or shank of the tool 5 is reciprocably supported with operating clearance. The auxiliary bore 8 is provided by bores 9a and 10a of a bushing 9 and tool holder 10, respectively, which are mounted in fixed axial position within the barrel 1 in coaxial relation with the cylinder bore 7. The tool holder 10 is rotatable about its axis for rotating the tool 5.

Mounted in the bores 7 and 8 is a piston 12 having a head 12a and a reduced diameter shank 12b. The piston 12 is arranged with its head 12a reciprocable in the power cylinder bore 7 and with its shank 12b extending into the auxiliary bore 8 for reciprocation axially of the bore 7 and 8. The shank 12b of the piston is provided with external straight or lineal splines 13 which engage complementary splines 14 in a sleeve 15 which is secured in fixed position in a tool holder 10. The tool holder 10 is mounted in the body for rotation about its axis and has an axial tool holding passage 16 which is out of round and preferably hexagonal, and in which the shank 5b of the tool 5 is supported for reciprocation. The piston shank 12b is mounted for reciprocation and rotation about its axis in the bushing 9. With this arrangement, as the piston 12 can rotate about its axis, and, due to the splines 14 and 15, it, in turn, can rotate the tool holder 10 and thereby the tool 5.

Figure 2:
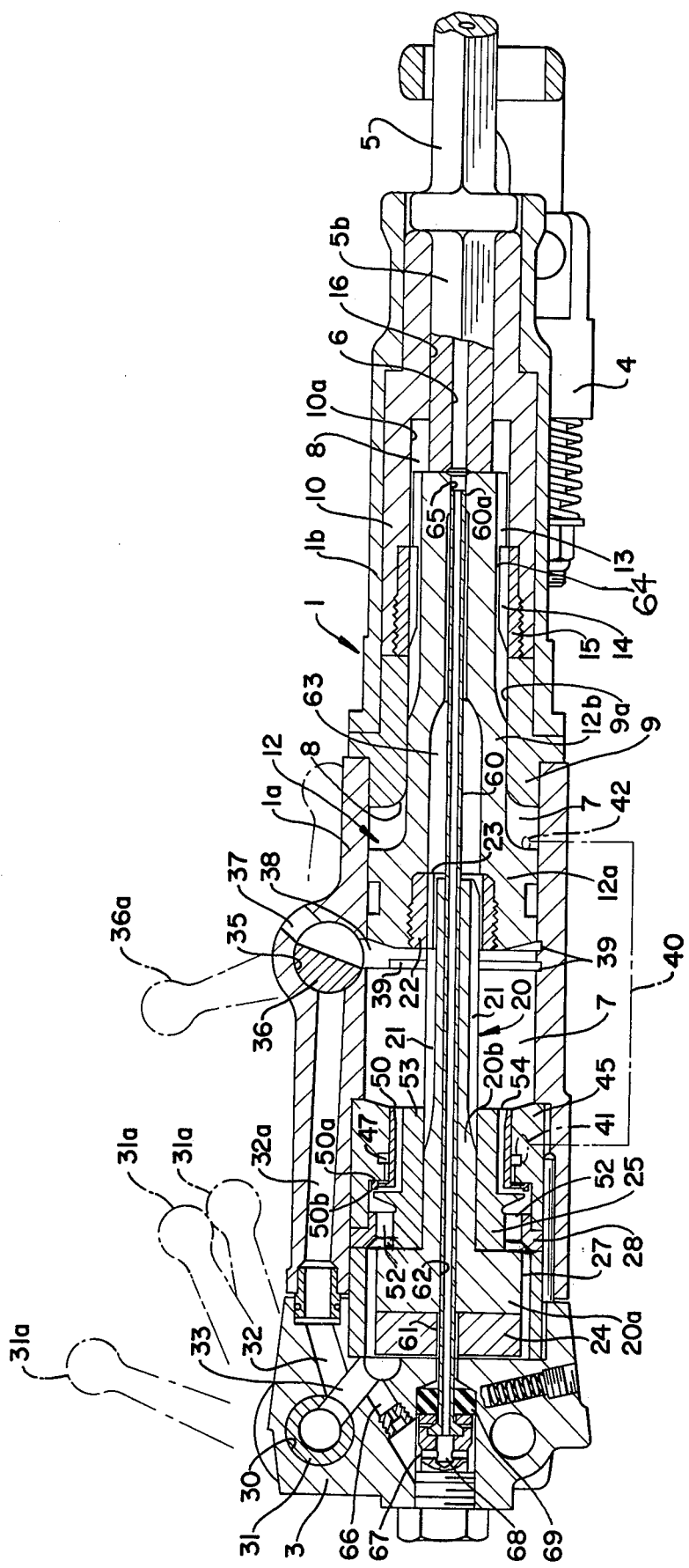
FIG. 2 is a longitudinal axial sectional view of the hammer taken on line 2—2 in FIG. 1, parts thereof being shown in elevation.
Figure 6:
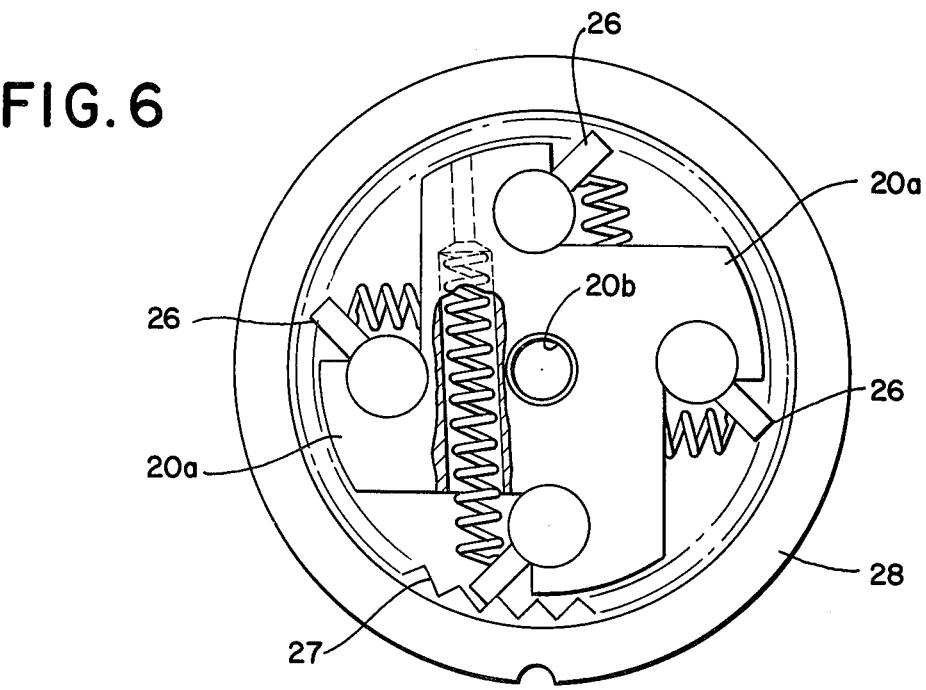
FIG. 6 is a left end elevation of a rifle bar and cooperating ratchet ring which may be provided in the hammer.
Figure 7:
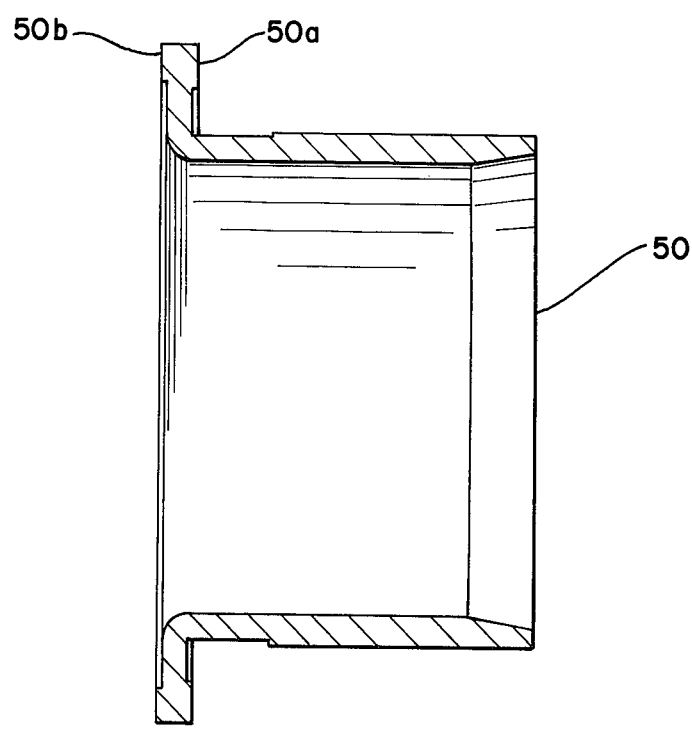
FIG. 7 is an enlarged longitudinal sectional view of the automatic control valve of the hammer.

In order to effect this rotation of the tool 5, a rifle bar 20 is mounted in the barrel in coaxial relation to the piston 12 and for relatively free rotation about its axis. The rifle bar 20 has a head 20a and a shank 20b. External helical splines 21 are provided on the shank 20b which extends into a suitable sleeve 22 which is fixedly mounted in the piston head 12a and has internal helical splines 23, complementary to the splines 21. The rifle bar head 20a is disposed in fixed axial position between a rifle bar bearing plate 24 and a valve stem member 25, later described. As best illustrated in FIG. 6, the head 20a of the rifle bar 20 carries spring expanded detents 26 which cooperate with suitable teeth 27 in a ratchet ring 28 which is fixedly mounted in the body. Thus, upon return of the piston 12 from an extended position, such as illustrated in FIG. 2, to a retracted position, the rifle bar 20 is prevented by the detents 26 from rotating, but, upon advance of the piston 12 on its power stroke, in the opposite direction from retracted position, the detents 26 disengage the teeth 27 of the ratchet ring 28 and permit free rotation of the rifle bar. As a result, the piston 12 rotates with the rifle bar 20, thereby rotating the tool holder 10 and tool 5, unidirectionally in one preselected rotatable direction on each piston return stroke, and the rifle bar 20 rotates freely, unrestrained by the detents 26 on each advance stroke of the piston. Since the splines 13 and 14 are lineal, then on each return stroke the piston 12, and hence the tool holder 10 and tool 5, are caused to rotate a partial revolution in said one preselected rotational direction and to remain in the rotated position during the succeeding power stroke of the piston 12 and until the next succeeding return stroke of the piston 12.

In order to drive the piston 12 on its power and return strokes, the body or barrel 1 is provided with an air inlet bore 30 adapted for connection to a source of pressurized air. A rotatable inlet valve 31, having a handle 31a, may be provided and rotatably mounted in the bore 30. The back head 3 is provided with ducts 32 and 33, respectively, which are connected with the inlet bore 30, and in the open position of the inlet valve 31, if provided, are connected to the source of pressurized air, and which, in the closed position of the valve 31 are disconnected from the source. The duct 32 has an extension duct 32a in the rear barrel portion 1. The duct 32a leads to an exhaust valve bore 35 in which is mounted a rotatable exhaust valve 36 having a handle 36a.

The bore 35 is connected to an exhaust passage 37 and to a valving passage 38 connected to the cylnder bore 7. The valve 36 is so arranged that in the open position it connects the passage 38 to the exhaust passage 37 and blocks the duct 32a, and in the closed position it connects the extension duct 32a to the passage 38 and blocks the exhaust passage 37.

The passage 38 leads to the cylinder bore 7 and has a port at its inner end. The passage 38 is positioned so that the port is exposed at the left end of the piston head 12a when the piston 12 is in extended position, and is exposed at the right hand end of the piston head 12a when the piston 12 is in a retracted position. Suitable troughs 39 may be provided in the cylinder bore wall, if desired, for facilitating the flow of air between the port and cylinder bore.

As illustrated in FIG. 4, the barrel 1 is provided with a duct 40 which is closed at its ends and is provided with ports 41 and 42 spaced endwise of the cylinder bore 7 from each other and opening into the cylinder bore 7. For convenience in reference, the duct 40, and its ports 41 and 42 are indicated in FIG. 2 by dot and dash lines. The duct 40 is arranged so that, in an advanced position of the piston 12, illustrated in FIG. 2, its port 42 is just to the right of the piston head 12a and its port 41 is near the left end of the bore 7, adjacent a suitable valve block 45, best illustrated in FIG. 5, so as to connect with a passage 46 therein. The passage 46 leads into an internal annular trough 47 for operating an automatic axially reciprocable valve 50 for causing reversal of the air supplied into the bore 7 so as to reciprocate the piston 12. The duct 33 is arranged to discharge air into the bore 7 through the ratchet plate 28 in the clearance space between the teeth 27, and the bearing plate 24, and between the plate 28 and the rifle bar head 20a, then through ducts 52 in the valve stem member 25, to a space 54 between the valve stem member 25 and the wall of the passage through the valve 50. The automatic valve 50 is reciprocable axially between the stem member 25 and valve block 45 and is arranged so that when the inlet valve 31 is in open position, live air is passed to the space between the valve stem member 25 and the valve block 45. For controlling this flow, the valve 50 has at its forward face a seat 50a which seats against the block 45 and at its opposite face a seat 50b which seats against a complementary face on the valve stem member 25. In the forward position of the valve 50, the seat 50a is in closed position, as illustrated in FIG. 2, and the air from the passage 52 enters the space 54 and passes between the seat 50b and the stem member 25 and flows through the annular central passage in the valve 50 and thence directly into the bore 7. When the valve 50 is shifted to the left in FIG. 2, the seat 50b seats against the stem member 25 and prevents this passage of air into the bore 7. Concurrently, the seat 50a unseats and directs the air entering the passage 54 from the passages 52 around the outside of the valve 50 and into the trough 47 in the valve block 45. This trough, as shown in FIG. 5, and as hereinbefore noted, connects with the passage 46 which, in turn, connects with the port 41 of the duct 40. Thus, when the valve 50 is shifted to the left and unseats the seat 50a, the live air is prevented from entering the central passage in the valve 50 and flowing to the left end of the bore 7, but instead, is by-passed around the valve 50, by way of the trough 47, passage 46, port 41, duct 40 and port 42 to the right end of the bore 7 so as to be effective on the opposite or right face of the head 12a of the piston 12 for returning the piston to retracted position.

As a result of this arrangement, so long as the exhaust valve 36 is open to connect the cylinder bore 7 to the exhaust passage 37, the piston 12 is driven on its power stroke until its head 12a passes the inner end port of the passage 38. Thereupon, the pressure to the left of the piston head 12a is vented to the atmosphere through the exhaust passage 37. As a result of travel of the piston 12 to the right on its power stroke, pressure is built up in the right end of the cylinder bore 7 and passes, by way of the duct 40, into the valve block 45 through the passage 46 and trough 47, and thus is directed to the right hand side of the enlarged annular head of the valve 50. Since, in this position of the piston 12, the passage 38 is open to connect to the exhaust passage 37, the pressure to the left of the piston head 12a is reduced to atmospheric pressure at the same time as the pressure from the right hand end of the cylinder bore 7 is directed against the right hand face of the head of the automatic valve 50. This drives the valve 50 to the left, causing the seat 50b to seat against the valve stem member 25 and the seat 50a to unseat. As soon as this occurs, air from the passage 52 into the passage 54 is directed by the valve 50 through the trough 47 and passage 46, duct 40, and port 42 into the cylinder bore 7 at the right hand end of the piston head 12a, thereby driving the piston to the left to its retracted position. As this travel continues, the piston head 12a covers the inner end port of the passage 38 cutting off the left hand end of the cylinder bore 7 from the exhaust. Continued leftward travel of the piston 12 increases the air pressure in the left hand end of the bore 7. When the piston head passes to the left of the inner end port of the passage 38, the bore 7 at the right of the piston head is vented to the atmosphere, through the passage 38, valve 36 and exhaust passage 37. This vents the port 41 in the valve block 45 by way of the duct 40, thus venting the trough 47 and eliminating the air pressure which was biasing the valve 50 to the left. Holding of the seat 50b in seated condition is discontinued, and immediately the live air entering through the passage 52, acts on the outer margin of the enlarged head of the valve 50, and returns the valve 50 to the position in which the seat 50b is unseated and the seat 50a is seated, thereby admitting air through the central passage of the valve 50 into the left end of the bore 7 for driving the piston 12 to the right on its power stroke, thus initiating a repetition of the cycle.

As mentioned, in some instances, it is desirable that blow-air is supplied through the passage 6 of the tool 5 continuously in an amount for agitating and maintaining suspended in air the fine dust particles in the hole being drilled without blowing the particulate matter out of the hole. One manner of providing a supply of blow-air, if such is desired, is by means of a by-pass tube 60. This tube is mounted in the back head 3, and extends through a series of coaxial passages, including a passage 61 in the cushion plate 24, a passage 62 in the rifle bar 20, a large passage 63 extending through the head 12a and partway through the shank 12b, of the piston 12, a smaller diameter passage 64 in the shank 12b and a final tube fitting passage 65, of further reduced diameter, at the impact delivery end of the shank 12b.

So long as the inlet valve 31 is open, air is continuously supplied into the rear end of the tube 60, through a series of ducts 66, 67, and 68 which are connected to the duct 33. A sealing washer 69 is provided to prevent passage of air from the duct 68 around the outside of the tube 60.

The length of the tube 60 is such that, in the retracted position of the piston 12, the outermost or front end of the end portion of the tube 60, as indicated at 60a, is disposed beyond the right hand end of the piston shank 12b. The tube 60 is much smaller in cross section than the passage 63 so as to provide a free air passage between the exterior of the tube 60 and interior wall of the passage 63. The tube 60 also is smaller in cross section than the passage 64 throughout the length of the passage 64 so that air can pass freely through the passage 64 around the outside of the tube 60. However, the end portion 60a of the tube 60 fits the passage 65 in slide fitting relation such that normally air cannot pass between the wall of the passage 65 and the exterior of the end portion 60a of the tube 60. The length of the tube 60 is so related to the length of the reduced passage 65, that in the fully retracted position of the piston 12, the end portion 60a extends out of the outlet or forward end of the shank 12b into the bore 8 and can discharge air thereinto. Hence the only air that can pass to the tool passage 6 in retracted position of the piston 12 is that passing through the tube 60. However, in the fully extended position of the piston 12, the end portion 60a of the tube 60 is withdrawn to the left from the reduced passage 65 so that air from the outlet or forward end of the tube 60 is discharged into the passage 64 and can pass freely therefrom through the passage 65 into the bore 8 and therefrom into the passage 6 of the tool 5. In this extended position of the piston 12, however, air can pass also from the cylinder bore 7 between the splines 23 of the sleeve 22 and the complementary splines 21 of the shank 20b of the rifle bar 20 into the passages 63, and can pass therefrom through the passages 64 and 65, into the forward end of the bore 8, and thence into the tool passage 6. In the position of the shank 12b of the piston during the instant it bears against the inner end of the tool 5, the air may pass in whole or part from the passage 65 directly into the passage 6.

Heretofore reliance was placed on the flow of live air through the valve 50 to the bore 7 and, in the manner just described, therefrom to passage 6 of the tool 5. This supply of blow-air was sufficient to agitate the particulate matter in the hole being drilled, but was insufficient for blowing the particulate matter, particularly coarse particles of material, from the drill hole.

In the present structure, with the exhaust valve 36 in closed position blocking the outlet passage 37, the piston 12 is air-locked in its extreme right hand extended position. In this position the exhaust valve 36 connects the bore 7, at the left of the piston, directly to the live air through the duct 32 and its extension 32a. Thus the limited supply of live blow-air through the tube 60 and through the valve 50, is supplemented by a much larger flow of blow-out air through the ducts 32 and 32a and exhaust valve 36 directly to the passage 38 and thence to the cylinder bore 7 at the left of the piston head 12a. This assures that the piston 12 remains in its fully extended position to the right, as no air then can be delivered through the port 42 to return the piston 12 to retracted starting position. This additional air in the bore 7, while holding the piston 12 in fully extended position, passes directly and freely between the splines 21 and 23 into the passage 63 around the outside of the tube 60. Since in this fully extended position of the piston 12 the end portion 60a of the tube 60 is withdrawn from the passage 65, this supplemental blow-out air continues, in turn, through the passages 63, 64, and 65 into the bore 8 and tool passage 6, greatly augmenting the flow of air issuing thereinto from the passage 65 from the discharge end of the tube 60. This supplemental flow of blow-out air through the passage 6 to the tip of the tool 5 blows out of the drill hole not only the fine dust, but coarser particulate material. This blow-out is effected only by closing the exhaust valve 36, and therefore only when the hammer is inactive for drilling.

The handles 31a and 36a are positioned relative to their valves and to the barrel 1 so that, as illustrated in FIGS. 1 and 2, both handles must extend transversely of the barrel of the hammer in the activated condition of the hammer. Both extend endwise of the barrel when the hammer and supply of air to the hammer are completely shut down. When, and only when, the handle 31a of the inlet valve 31 extends transversely of the barrel 1, or live air is otherwise supplied to the barrel inlet, and the handle 36a of the exhaust valve extends endwise of the barrel 1, is the augmenting supply of supplemental blow-out air delivered to the outer end or tip of the tool 5 through the passage 6. This supply can occur when, and only when, due to this same valve setting, the piston 12 is held extended by the air-lock effected by the exhaust valve 36 and therefore inoperative to drive the tool 5. Both valve handles 31a and 36a will be endwise of the barrel when the hammer is inoperative. Thus if either handle 31a or 36a is accidentally moved to a position transversely of the barrel, neither the operator nor bystander will be injured by accidentally starting the hammer.

Having thus described my invention, I claim:
1. In a reciprocating air hammer, an elongated body having a front end and a rear end, and power cylinder bore;

a power piston reciprocable in the cylinder bore from a retracted starting position to an extended power delivery position, and return;

tool supporting means at the front end of the body for holding a tool for axial reciprocation in coaxial relation to said bore and in position to be struck by the piston on the power delivery stroke;

said body, at its rear end, having an air inlet passage connected to the cylinder bore and adapted for connection to a source of pressurized air, and having a lateral exhaust passage at a first location, endwise of the body, near the rear of the piston in the extended position of the piston, said exhaust passage being connected at its inlet end to the cylinder bore in said extended position of the piston;

said body having a blow out air conduit means connecting the air inlet passage with the exhaust passage;

automatic valving means between the inlet and rear of said bore and operative, when active, to cause delivery of live air from the inlet passage to the cylinder bore in a manner to drive the piston on power and return strokes, alternately in succession;

an inlet valve at the rear of the body for admitting and cutting off the delivery of live air to the inlet passage;

a settable exhaust valve separate from, and settable independently of, said inlet valve, and connected to said blow out air conduit means and said exhaust passage, and settable, selectively, in a first position in which it connects the exhaust passage to the atmosphere, and in a second position in which it disconnects the exhaust passage from the atmosphere and concurrently connects it to the blow out air conduit means;

means rendered operative by setting the exhaust valve in said first position to render the automatic valving means active;

means rendered operative by setting the exhaust valve in said second position to render the automatic valving means inactive and thereby to discontinue reciprocation of the piston while continuing to admit live air to the rear of the cylinder bore, and to connect said blow out air conduit means to the cylinder bore at said first location, and thereby to deliver a flow of blow air through the automatic valve and, concurrently, a direct flow of blow out air into the power cylinder bore at first said location;

one blow air conduit means, including passage means extending through the piston from one end to the other, operative during operation of the piston, to conduct the limited air of that live air, admitted by the automatic valve to the cylinder bore, to a second location from which it can flow freely to the tool during operation of the piston in extended position of the piston;

additional blow air conduit means, extending part way through said passage means in the piston and operative, in all positions of the exhaust valve means, for conducting an additional limited flow of blow air continuously from the inlet passage to said second location in by-passing relation to, and independently of, the automatic valve means, the total of said blow air being insufficient to blow particles out of the hole being drilled; and said blow out air conduit means, rendered operative by setting the exhaust valve means in said second position, conducting live blow out air continuously from the inlet passage, in by-passing relation to the additional blow air conduit means and to the automatic valving means, to and through said passage means in the piston to said second location in addition to, and in an amount greater than, the total amount of said blow air being conducted to said second location, and said amount being such that the total of blow air and blow out air can blow out coarse particles of material from a hole being drilled by the tool.

2. A structure according to claim 1 including an auxiliary bore in the body coaxial with the cylinder bore; said tool supporting means includes a tool supporting passage in which is supported a tool have an air passage therethrough which is open at its inner end for receiving live air from the auxiliary bore when the tool is supported for reciprocation in the supporting passage with its inner end out of contact with the driving end of the piston, and for direct connection at its inner end with the outlet of said passage means when the inner end of the tool in the fully extended position of the tool is in direct contact with the adjacent end of the piston; and said second location is a portion of said auxiliary bore.

3. The structure according to claim 1 wherein said additional blow air conduit means includes a tube carried by the body and extending axially through said cylinder bore and partway through said passage of said piston, at least in the retracted position of the piston, for conducting air to said second location.

* * * * *